United States Patent [19]

Satō

[11] Patent Number: 5,775,604
[45] Date of Patent: Jul. 7, 1998

[54] GLASSWARE CRUSHING, GRADING, SCREENING AND COLLECTING DRY-TYPE METHOD AND APPARATUS

[75] Inventor: Kōithi Satō, Yamagata-ken, Japan

[73] Assignees: Kaneto Co., Ltd., Kaminoyama; Kankyohozenservice Co., Ltd., Mizusawa, both of Japan

[21] Appl. No.: 813,187

[22] Filed: Mar. 10, 1997

[51] Int. Cl.$^6$ .................................................. B02C 19/14
[52] U.S. Cl. .................. 241/24.22; 241/79.1; 241/99; 241/154; 241/DIG. 38
[58] Field of Search ................ 241/24.15, 24.22, 241/79.1, 99, 154, DIG. 38

[56] References Cited

U.S. PATENT DOCUMENTS

| | | |
|---|---|---|
| 4,795,103 | 1/1989 | Lech. |
| 4,867,384 | 9/1989 | Waltert. |
| 5,505,390 | 4/1996 | Rodgers ................ 241/48 |
| 5,520,343 | 5/1996 | Aika et al. ............ 241/99 |
| 5,524,837 | 6/1996 | Raynes. |

FOREIGN PATENT DOCUMENTS

| | | |
|---|---|---|
| 2 485 504 | 6/1982 | France. |
| 26 38 608 | 3/1978 | Germany. |
| 37 09 179 | 3/1988 | Germany. |

*Primary Examiner*—John M. Husar
*Attorney, Agent, or Firm*—Wenderoth, Lind & Ponack, L.L.P.

[57] ABSTRACT

Glassware such as glass bottles and the like is crushed, graded, screened and collected in accordance with the size of the crushed glass. Glassware such as glass bottles is supplied to a glassware charging frame passed to a first crusher and crushed by the first crusher. Metal is removed from the glassware crushed by the first crusher. The thus crushed glassware with iron pieces having been removed is supplied to a last crusher. Glassware crushed by the last crusher is supplied to a sieve device. The glassware crushed by the last crusher is selected in accordance with grain size by the sieve device. The glassware selected in accordance with grain size then is collected.

19 Claims, 4 Drawing Sheets

5,775,604

GLASSWARE CRUSHING, GRADING, SCREENING AND COLLECTING DRY-TYPE METHOD AND APPARATUS

BACKGROUND OF THE INVENTION

1. Technical Field

This invention relates generally to a method and apparatus for crushing glassware such as glass bottles and the like and, particularly, to a glassware crushing, grading, screening and collecting dry-type method and apparatus. Crushing is effected to crush glassware into a grain size not larger than a predetermined size. Grading is effected to select and collect the crushed glass according to size or the grading thereof.

2. Prior Art

Heretofore, a large number of used glass bottles have been conveyed to bottle making factories and crushed into cullet. The cullet having a predetermined size (the size or the diameter is about 2.5–5.0 cm) is utilized as a raw material for making new bottles. However, a finely crushed portion has usually been treated as industrial waste and drained off together with cleaning water. Further, it is inefficient to transport used empty glass bottles from a place far from a recycling factory. Therefore, waste bottle recovery in such places has not been substantially utilized.

In Japanese Patent Application 5-141958, there is proposed a cullet producing machine which enables crushing of used glass bottles, which have been collected at liquor shops or supermarkets, into cullet on the spot, so that the cullet can be conveyed to bottle making factories. Transportation efficiency can thereby be improved and a large amount of cullet can be recovered from regions far from the glass bottle making factories.

In accordance with improvements in transportation efficiency, it has become possible to recover cullet from distant places in a country and thus a shortage of cullet for bottle factories is alleviated. However, owing to an increase in transportation costs it is now unprofitable to convey cullet to bottle factories. As a result, the recovery of used glass bottles is not performed, thus contributing to pollution and resource waste.

SUMMARY OF THE INVENTION

Accordingly, the inventor has researched and studied the reuse of used glass bottles and, found that finely crushed glass, which has been formed during the making of cullet and treated as industrial waste and drained off together with cleaning water, can be utilized as a substitute for natural sand. Natural sand is utilized as an aggregate of concrete, a colored pavement material, as a material for white lines on an asphalt roads, various abrasive materials, raw materials of pottery, construction materials for outer walls and the like, and raw materials for construction blocks, and the like. Thus, heavy demands are made on this natural resource and it is highly desirable to reuse used glass bottles and the like as a substitute for natural sand.

According to the present invention, there is provided a method and apparatus for crushing glassware such as glass bottles and the like, and for grading, screening and collecting the crushed glass in accordance with the size of the crushed glass, the method comprising the steps of:

supplying the glassware such as glass bottles to a glassware charging frame, supplying the glassware to a first crusher, crushing the glassware in the first crusher, removing iron from the glassware crushed by the first crusher, supplying the resulting glassware to the last crusher, supplying the glassware being crushed by the last crusher to a sieve device, selecting the glassware being crushed by the last crusher in accordance with the grain size by the sieve device, and collecting the glassware being selected in accordance with the grain size.

Further objects and advantages of the present invention will become apparent from the following detailed description showing some preferable embodiments of the present invention. However, it will be noted that the present invention is not limited to these embodiments and, various changes and modifications can easily be made for those skilled in the art within the scope of the present invention.

DETAILED DESCRIPTION OF PREFERRED EMBODIMENTS

Figure 1:
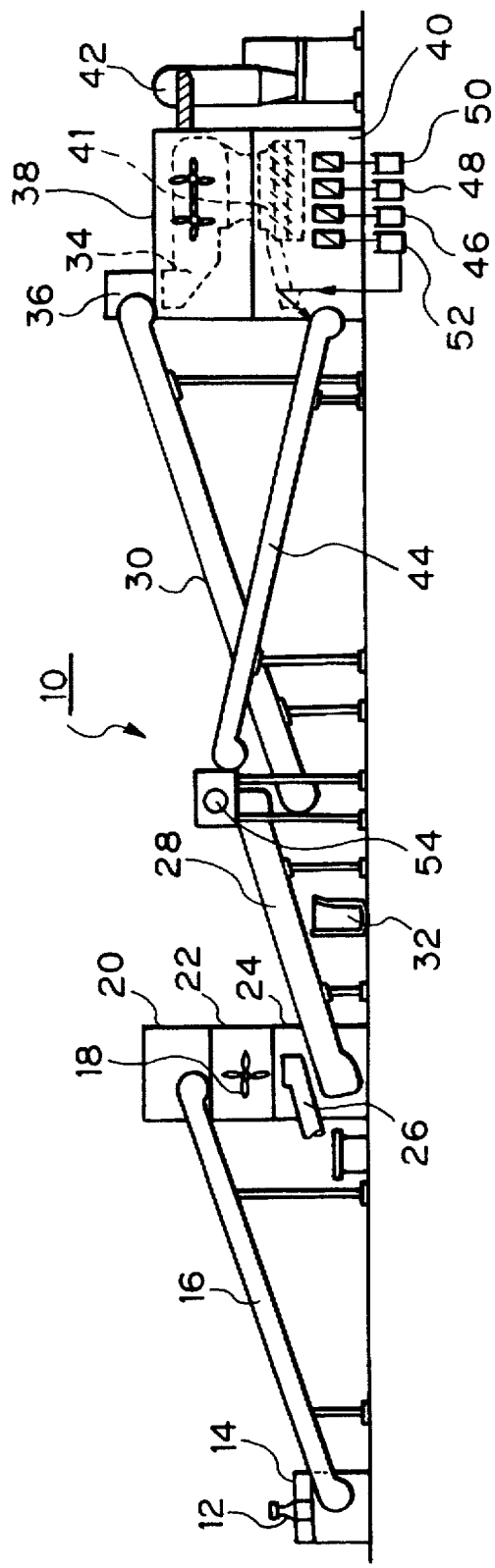
FIG. 1 is a schematic side view of a dry-type glassware crushing, grading, screening and collecting device according to a first embodiment of the present invention.

A dry-type glassware crushing, grading, screening and collecting device 10 according to a first embodiment of the present invention is shown schematically in FIG. 1. In the device 10, glassware 12 such as used glass bottles and the like are supplied to a glassware charging frame 14. The glassware 12 supplied to the glassware charging frame 14 are conveyed by a first conveyor 16 being driven by a driving source such as an electric motor and the like to a primary or a first crusher 18. The first crusher 18 is constituted of a receiving portion 20 for receiving the glassware to be crushed, a crushing portion 22, and a carrying out portion 24. The receiving portion 20 is a hopper for receiving the glassware 12 which is conveyed by the first conveyor 16. The crushing portion 22 has a rotor therein for crushing the glassware 12 falling from the receiving portion 20. The primarily crushed glassware 12 crushed in the crushing portion 22 falls into the carrying out portion 24. Preferably, a selection machine 26 is provided between the crushing portion 22 and the carrying out portion 24 as shown in FIG. 1. The selection machine 26 selects out paper and the like such as labels attached to the bottle crushed by the crusher 18, caps and the like formed of a metal or cork and the like, glass pieces not being crushed by the crusher 18 and having a size larger than a predetermined size, and discharges out of the crusher 18. Incidentally, the selection machine 26 may be omitted when the glassware is cleaned by water with the labels and the like being removed and any caps also being removed.

Articles being crushed and collected by the carrying out portion 24 are supplied to a second conveyor 30 through a magnetic selection conveyor 28. Metal pieces such as caps and the like and mixed in the articles being crushed are attracted by the magnetic selection conveyor 28 and are received finally by a metal receiving container 32. Articles supplied to the second conveyor 30 through the magnetic selection conveyor 28 are sent to a second crusher 34 (in the embodiment shown in FIG. 1, the last crusher). The second crusher 34 comprises a receiving portion 36 for receiving the articles being conveyed through the second conveyor 30, a crushing portion 38 for finely crushing the articles, and a carrying out portion 40 for selecting the crushed articles in accordance with grain size and carrying out the selected articles. The receiving portion 36 is a hopper for receiving the glass articles being crushed by the first crusher 18 and conveyed by the second conveyor 30. The crushing portion 38 comprises a pair of rotors for finely crushing the article supplied from the receiving portion 36. As compared with the rotor in the crushing portion 22 of the first crusher 18, the rotor in each crushing portion 38 has a space between its blades which is narrower than that of the first crusher 18 and/or the rotational speed higher than that of the first crusher 18. Further, in the embodiment shown in FIG. 1, two rotors are provided for finely crushing the glass. A dust collector 42 is connected to the crushing portion 38 to remove from the crushing portion 38 minutely crushed glass powder or dust generated by the rotor rotating at high speed. The crushed glassware formed by the crushing portion 38 fall into carrying out portion 40. A sieve device 41 consisting of a plurality of sieves having various dimensions and constituting a multiple stage is provided in the carrying out portion 40. Usually, the sieves are vibrated so as to improve the efficiency of the sieve device 41.

The finely crushed glassware formed in the crushing portion 38 are sent to vibrating multiple stage sieve device 41, and sorted in accordance with the sizes of the sieves. The sizes or the meshes of the sieves are, according to a preferable embodiment of the invention, about 5.0 mm in the highest or the first stage, about 2.5 mm in the next stage, and about 1.0 mm in the lowest or the last stage. The crushed glass not passing through the highest sieve and having the size generally larger than 5.0 mm are supplied to a return conveyor 44 to be crushed again by the second crusher 34. The crushed glass passing through the highest sieve and not passing through the sieve of the next stage and having generally a size of 2.5 mm–5.0 mm are collected in a container 46. The crushed glass of this size have rounded broken surfaces and are particularly adapted for use as, and replacing sand in a promenade. The crushed glass passing through the second sieve and not passing through the sieve of the next stage and having generally the size of 1.0 mm–2.5 mm are collected in a container 48. The crushed glass of this size are particularly adapted for uses such as the aggregate of asphalt. The crushed glass or the glass powder passing through the last sieve and having generally the size of 1.0 mm or lower are collected in a container 50. The glass powder having the size of 1.0 mm or lower can be utilized as building material, abrasive material or road pavement material.

Any material not passing through any of the sieves of the sieve device 41 are collected by a container 52. The material collected in the container 52 are sent to the return conveyor 44 similar to that which could not pass through the first sieve.

The material conveyed by the return conveyor 44 is sent to a paper sorting portion 54. The paper sorting portion acts to assist the paper selection machine 26 such that paper not removed by the paper selection machine 26 is mainly separated from the glass by the second crusher 34 and the sieve device 41, and the paper sorting portion 54 acts to remove remaining paper. The material passing through the paper sorting portion 54 are sent to the second crusher 34. The paper sorting portion 54 may be omitted as described and, in such case, the material conveyed by the return conveyor 44 may be returned to the second crusher 34. By repeating crushing, it is possible to produce the crushed glass product being classified into three types according to grain size.

Figure 2:
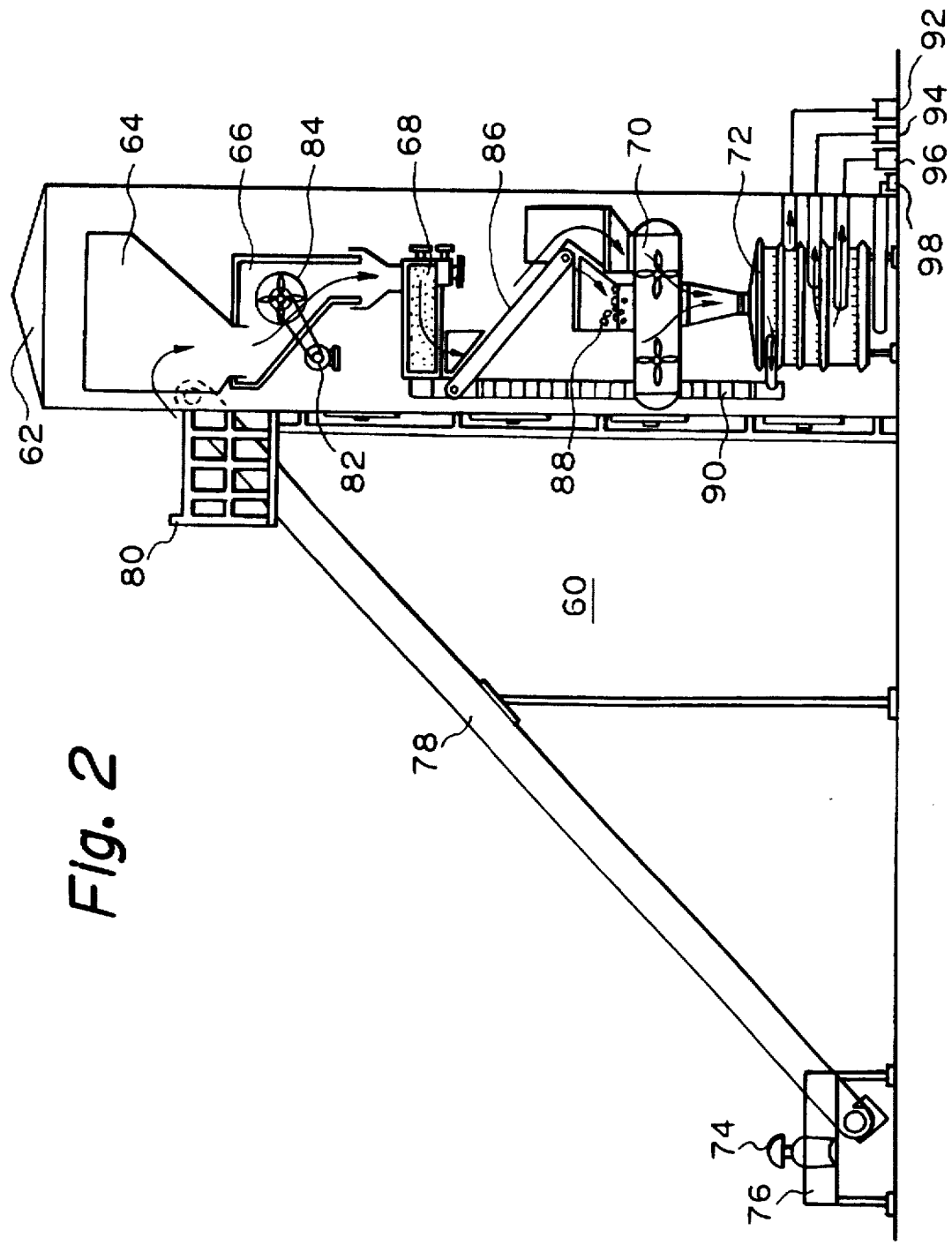
FIG. 2 is a schematic side view of a dry-type glassware crushing, grading, screening and collecting device according to a second embodiment of the present invention.

FIG. 2 shows another embodiment of the present invention. The crushing, grading, screening and collecting device 60 shown in FIG. 2 differs from the device 10 of the first embodiment in that the entire device including the first crusher and the second crusher is vertically arranged and is received in a process tower 62 thereby decreasing the required ground area. Provided inside of the process tower 62 are, a receiving hoppper 64, a first crusher 66, a selection portion 68, a second crusher 70, a vibration sieve device 72 and the like. Provided outside of the process tower 62 are, a glassware receiving frame 76 for receiving glassware 74 such as used glass bottles and the like, a first conveyor 78 for conveying the glassware from the glassware receiving frame 76 to the process tower 62, a working platform 80 for the operator, and the like.

In the crushing, grading, screening and collecting device 60 shown in FIG. 2, glassware 74 such as used glass bottles and the like is supplied to a glassware charging frame 76. The glassware 74 supplied to the glassware charging frame 76 is conveyed by first conveyor 78 being driven by a driving source such as a well known electric motor and the like not shown in the drawing to the receiving hopper 64 provided at the highest portion of the process tower 62. The glassware 74 is sent from the receiving hopper 64 to the first crusher 66. The first crusher 66 has, similar to the first crusher 18 in FIG. 1, a rotor 84 driven by a driving source 82 such as an electric motor and acts to crush the glassware 74 dropping through the hopper 64. The preliminiarily crushed glassware crushed by the first crusher 66 is sent to the selection portion 68. The selection portion 68 takes out paper and the like such as labels attached to the glass bottles crushed by the crusher 66, caps and the like formed from metal or cork and the like, glass pieces not being sufficiently crushed by the crusher 66 and having a size larger than a predetermined size, and discharges out of the crusher 66. Labels and the like are discharged out of the system. Incidentally, the selection portion 68 may be omitted when the glassware are beforehand cleaned by water, with labels and the like being removed and the caps also being removed.

The crushed glassware passed through the selection portion 68 are supplied to the second crusher 70 through magnetic selection conveyor 86. The magnetic selection conveyor 86 attracts metal such as caps of bottles out of the crushed articles, and such metal pieces are received in an iron piece receiving container. Next, the glassware to be crushed is sent to the second crusher 70 through the magnetic selection conveyor 86 and is finely crushed. Further, crusher 70 has two rotors. Similar to the first embodiment, as compared with the rotor in the crushing portion 84 of the first crusher 66, each rotor in the second crusher 70 has a space between blades thereof narrower than that of the first crusher 66 and/or a rotational speed higher than that of the first crusher 66. Further, in the embodiment shown in FIG. 2, two rotors are provided for finely crushing the glass.

Similar to the first embodiment, a dust collector is connected to the second crusher 70 to remove minutely crushed glass powder or dust generating by the rotor rotating at high speed. The crushed glassware formed by the second crusher 70 falls into and is supplied to a vibration sieve device 72. The sieve device 72 consists, similar to that used in such as a combined harvester and thresher for agricultural usage, of a plurality of sieves having various respective dimension and constituting multiple stages.

The crushed glassware supplied to the vibrating sieve device 72 is sorted according to the sizes of the sieves. Similar to the first embodiment, the sieve device 72 includes an uppermost sieve having a mesh size of about 5.0 mm, an intermediate sieve having a mesh size of about 2.5 mm, and a lowest stage of sieve having a mesh size of about 1 mm. The crushed glassware not passing through the uppermost sieve and having the size of about 5.0 mm or more are supplied to return conveyor 90 and crushed again in the second crusher 70. The glass powder passing through the uppermost sieve and not passing through the intermediate sieve with the size being about 2.5 mm–5.0 mm are received in a container 92. Crushed glass of this size has rounded broken surfaces and, is particularly adaptable for use as a substitute for natural sand in pavements. Crushed glass passing through the second sieve and not passing through the sieve of the last stage and having generally the size of 1.0 mm–2.5 mm is collected in a container 94. Crushed glass of this size is particularly adaptable for use as an aggregate of asphalt. Crushed glass or glass powder passing through the last sieve and having generally the size of 1.0 mm or lower is collected in a container 96. The glass powder having a size of 1.0 mm or lower can be utilized as a building material, abrasive material or road pavement material. The crushed glassware not passing through any of sieves in the sieve device 72 is collected in a container 98. The glassware collected in the container 98 is supplied to the return conveyor 90. The return conveyor 90 is preferably a bucket conveyor.

In this embodiment, the crushed glassware conveyed by the return conveyor 90 is returned to the upper portion of the magnetic selection conveyor 86. However, it is possible to return directly to the second crusher 70. Further, it is also possible to return to the selection portion 68 such that the crushed glassware with paper such as labels attached thereto, thereby being prevented from passing through the uppermost sieve, can be separated from the paper. The crushed glassware conveyed by the return conveyor 90 is crushed again by the second crusher 70. By repeating the crushing operation, it is possible to produce crushed glass sorted into three types in accordance with grain size.

Figure 3:
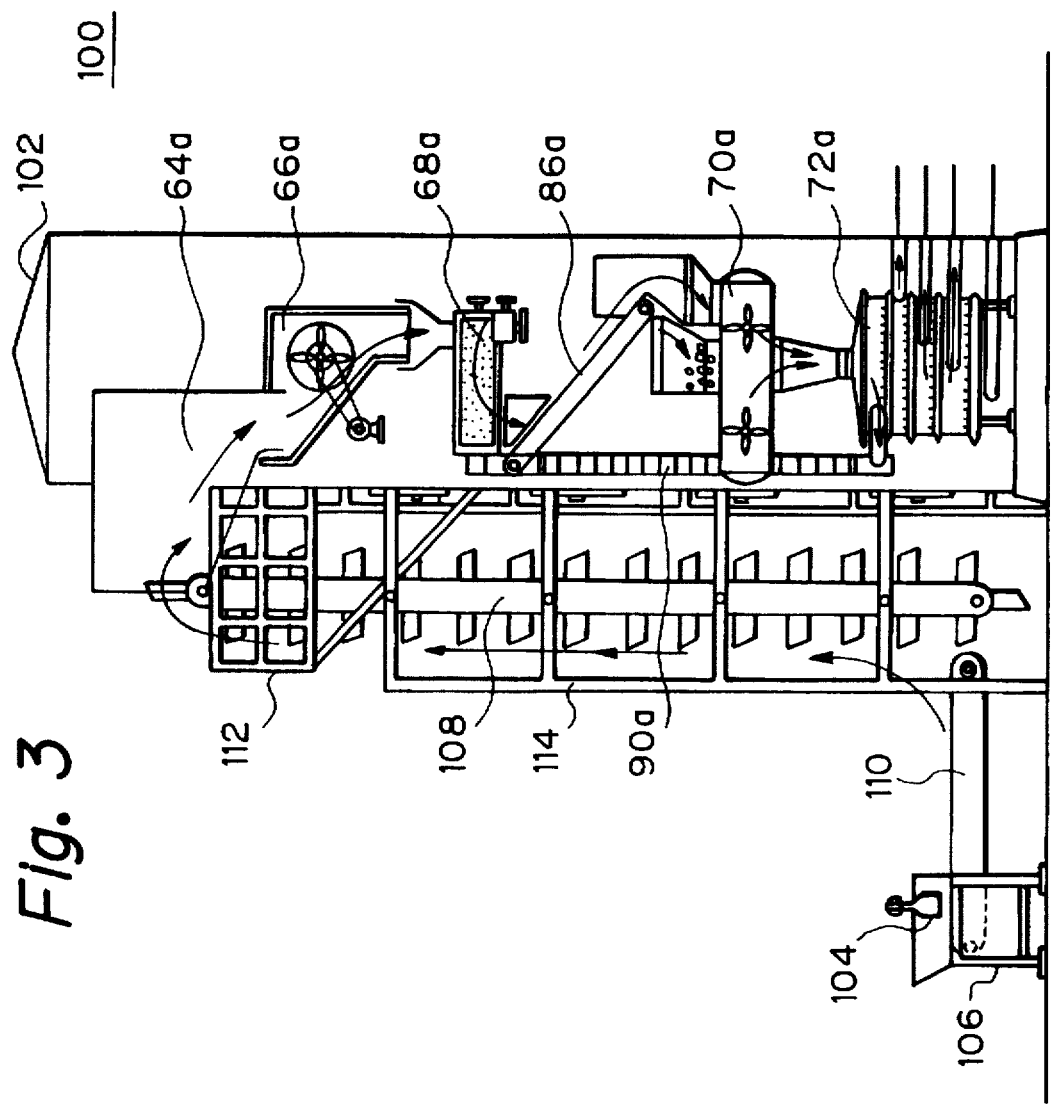
FIG. 3 is a schematic side view of a dry-type glassware crushing, grading, screening and collecting device according to a third embodiment of the present invention.

The embodiment shown in FIG. 3 is substantially similar to the second embodiment, but the first conveyor 78 in the second embodiment is replaced by a bucket conveyor 108, thereby decreasing further the required ground area. Particularly, the glassware crushing, grading, screening and collecting apparatus 100 shown in FIG. 3 includes a process tower 102 substantially similar to the process tower 62 in the second embodiment, a glassware charging frame 106 for receiving glassware 104 such as used glass bottles, a bucket type first conveyor 108 for supplying the glassware to the process tower 102, and a supplying conveyor 110 for sending the glassware 104 from the glassware charging frame 106 to the first conveyor 108.

In the third embodiment shown in FIG. 3, the glassware 104 such as used glass bottles is supplied to the glassware charging frame 106. The glassware 104 is supplied to a lower charge opening (not shown in the drawing) of the bucket conveyor 108 by horizontal conveyor 110 driven by a drive source (not shown) such as a well known electric motor. The glassware charging frame 106 and the horizontal conveyor 110 may be omitted by providing a hopper in the lower portion of the bucket conveyor 108 and charging the, glassware therein, whereby the ground area required can further be reduced. The glassware 104 supplied to the bucket conveyor 108 is sent to a receiving hopper 64a similar to the hopper 64 in the second embodiment and, thereafter, are routed sequentially a first crusher 66a, a selection portion 68a, a magnetic selection conveyor 86a, a second crusher 70a, a vibration sieve device 72a, and the like generally similar to respective devices shown in the second embodiment. Thus, the crushed glassware are sorted according to grain size. The crushed glass having a grain size larger than a predetermined size are, similar to the second embodiment, returned by a return conveyor 90a to repeat the crushing operation. In FIG. 3, shown at 112 is a platform, and at 114 is a strut.

In the above embodiments, the second crushers constitute the last crushers, however, it is possible to provide one or more auxiliary crushers between the first crusher and the last crusher, and carry-in and carry-out conveyors may be provided separately for the auxiliary conveyor. The sizes of the meshes in the sieves and the number of sieves can be determined according to the use of the final product and as desired.

Figure 4:
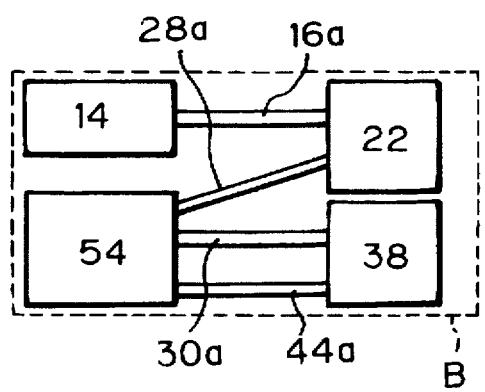
FIG. 4 is a plan view showing a device according to the present invention and being mounted on a load carrying platform of a vehicle.
Figure 5:
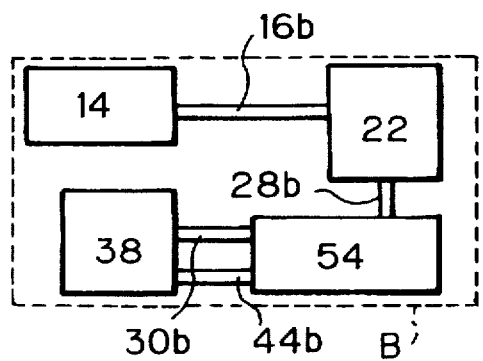
FIG. 5 is a plan view showing another example of the device according to the present invention and being mounted on a load carrying platform of a vehicle.
Figure 6:
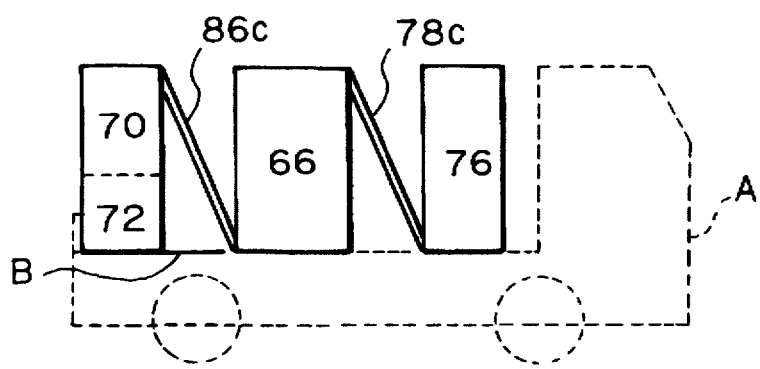
FIG. 6 is a plan view showing a further example of the device according to the present invention and being mounted on a load carrying platform of a vehicle.
Figure 7:
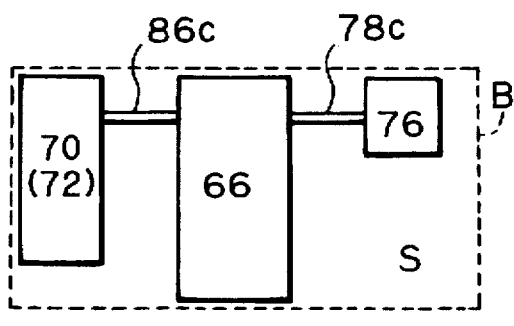
FIG. 7 is a plan view of the device of FIG. 6 with the portion of the vehicle being removed.
Figure 8:
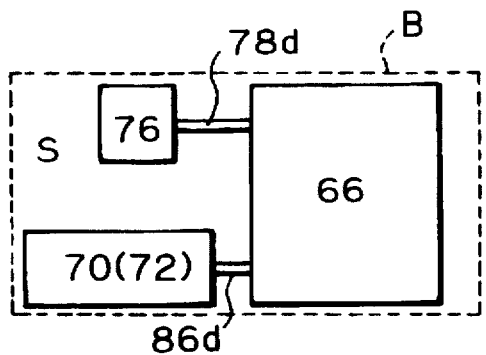
FIG. 8 is a view showing a modified form of FIG. 7.

Above described embodiments are mass production type apparatus fixed on a ground or on a floor. However, it is possible to reduce the size such that the apparatus can be mounted on a load carrying platform B of a vehicle A as shown in FIG. 6. In such case, as shown in FIG. 4, a glassware charging frame 14, a first crusher 22, a second crushing portion 38 and a paper selection machine 54 are arranged in fore and aft directions as shown in the drawing, such that the glassware are conveyed from the glassware charging frame 14 to the first crushing portion 22 by a forwardly and upwardly inclined conveyor 16a, that the glassware are sent back to the paper selection machine 54 by rearwardly and upwardly inclined conveyor 28a, and are sent again to the second crushing 38 by upwardly and forwardly inclined conveyor 30a. Incidentally, the conveyor denoted by numeral 44a is a return conveyor inclined rearwardly and upwardly. Further, as shown in FIG. 5, it is possible to arrange parallelly the glassware charging frame 14 and the second crushing portion 38, to arrange parallelly the first crusher 22 and the paper selection machine 54, and to connect these elements with one another through conveyors 16b, 28b, 30b and 44b having respectively the same functions as to those shown in FIG. 4. Further, the device shown in FIG. 2 or FIG. 3 may be replaced by a device shown in FIGS. 6 and 7, in which a glassware charging frame 76, a first crusher 66, and a second crusher 70 and a vibration sieve device 72 are arranged in a straight line, and are connected with each other through rearwardly and upwardly inclined conveyors 78c and 86c, whereby similar effects can be obtained. Further, FIG. 8 shows another embodiment in which a glassware charging frame 76, a first crusher 66, a second crusher 70 and a vibration sieve device 72 are arranged generally in a U-shape and are connected by conveyors 78d and 86d. A working space S is provided around the glassware charging frame 76.

The fixed type devices shown in FIG. 1 through FIG. 3 are of large size, and have high performance. Thus, it is possible for used glass bottles and the like to be collected from various districts, including distant places, with glass sand products being formed on a large scale and stored at a predetermined stockyard, and then products being conveyed to the places of usage as desired. However, the devices shown in FIG. 4 through FIG. 8 can be adapted to be mounted on a vehicle such as a truck and the like, and made portable to obviate the need to convey used glass bottles over a long distance, to provide a stockyard for storing glass sand products, and to reduce transportation costs.

In the illustrated embodiments, there is provided between the first crusher and the second crusher a metal removing device, but the metal removing device may be omitted as desired and the first and the second crushers may be connected directly. Such arrangement is advantageous in a device mounting on a vehicle.

As described heretofore in detail, the present invention overcomes the problem in the prior art cullet producing device in that although used glass bottles can efficiently be recycled, a large amount of finely crushed glass as industrial waste has been abolished. According to the present invention, the glassware are crushed finely as compared with the cullet, and are utilized, according to size, as a substitute for natural sand used in pavements, as an aggregate of asphalt, and as a building material, abrasive material or road pavement material according to the size of the glass powder.

I claim:

1. A method for crushing glassware to form crushed glass having rounded broken surfaces and that can be used as a substitute for natural sand, and for grading, screening and collecting said crushed glass according to sizes thereof, said method comprising:
   supplying glassware to be crushed to a glassware charging frame;
   feeding the thus supplied glassware to a first crusher having a rotor having spaced blades;
   crushing said glassware by said first crusher to thus form preliminarily crushed glass;
   supplying said preliminarily crushed glass to a last crusher having at least two rotors each having spaced blades;
   crushing said preliminarily crushed glass by said last crusher to thus form finely crushed glass having rounded broken surfaces;
   said crushing by said last crusher including providing spaces between said blades of each of said two rotors to be smaller than spaces between said blades of said rotor of said first crusher and rotating said two rotors at a speed greater than a speed of rotation of said rotor of said first crusher;
   screening said finely crushed glass with a sieve device to thereby grade said finely crushed glass according to different sizes thereof; and
   collecting the thus graded different sizes of said finely crushed glass.

2. A method as claimed in claim 1, wherein said glassware to be crushed includes metal pieces, and further comprising removing said metal pieces from said preliminarily crushed glass before supply thereof to said last crusher.

3. A method as claimed in claim 1, further comprising returning any said finely crushed glass that does not pass through said sieve device to said last crusher and therein again crushing the thus returned finely crushed glass.

4. An apparatus for crushing glassware to form crushed glass having rounded broken surfaces and that can be used as a substitute for natural sand, and for grading, screening and collecting the crushed glass according to sizes thereof, said apparatus comprising:
   a glassware charging frame for receiving glassware to be crushed;
   a first conveyor for feeding the glassware from said glassware charging frame;
   a first crusher for receiving the glassware from said first conveyor and for crushing the glassware to thus form preliminarily crushed glass, said first crusher including a rotor having spaced blades;
   a last conveyor for feeding the preliminarily crushed glass from said first crusher;
   a last crusher for receiving the preliminarily crushed glass from said last conveyor and for crushing the preliminarily crushed glass to thus form finely crushed glass having rounded broken surfaces, said last crusher including at least two rotors each being rotatable and each having spaced blades, said last crusher having a construction that spaces between said blades of each of said two rotors are smaller than spaces between said blades of said rotor of said first crusher and that a speed of rotation of said two rotors is greater than a speed of rotation of said rotor of said first crusher;
   a sieve device for screening the finely crushed glass and thereby grading the finely crushed glass according to different sizes thereof;
   accumulating devices for collecting the thus graded different sizes of the finely crushed glass; and
   a return conveyor adjacent said sieve device for returning finely crushed glass greater than a predetermined size to said last crusher to again be crushed thereby.

5. An apparatus as claimed in claim 4, wherein the glassware to be crushed includes metal pieces, and further comprising a separation device for removing the metal pieces from the preliminarily crushed glass before supply thereof to said last crusher.

6. An apparatus as claimed in claim 5, wherein said separation device comprises a separation conveyor positioned between said first crusher and said last conveyor.

7. An apparatus as claimed in claim 6, wherein said separation conveyor is a magnetic conveyor.

8. An apparatus as claimed in claim 5, wherein said separation device is operable to separate the metal pieces magnetically.

9. An apparatus as claimed in claim 5, wherein said separation device is said last conveyor.

10. An apparatus as claimed in claim 9, wherein said last conveyor is operable to separate the metal pieces magnetically.

11. An apparatus as claimed in claim 4, further comprising a return conveyor for returning any finely crushed glass that does not pass through said sieve device to said last crusher, such that the thus returned finely crushed glass again is crushed by said last crusher.

12. An apparatus as claimed in claim 4, wherein said glassware charging frame, said first conveyor, said first crusher, said last conveyor and said last crusher are arranged in that order in a side-by-side arrangement.

13. An apparatus as claimed in claim 12, wherein said sieve device is positioned below said last crusher.

14. An apparatus as claimed in claim 4, wherein said first crusher, said last conveyor, said last crusher and said sieve device are arranged in that order one below the other.

15. An apparatus as claimed in claim 4, wherein the glassware to be crushed has thereon labels, and further comprising a label sorting device for removing the labels from the preliminarily crushed glass.

16. An apparatus as claimed in claim 15, wherein said label sorting device is positioned below said first crusher.

17. An apparatus as claimed in claim 4, wherein said last crusher comprises a second crusher.

18. An apparatus as claimed in claim 4, further comprising an intermediate crusher positioned between said first crusher and said second crusher.

19. An apparatus as claimed in claim 4, wherein said apparatus is mounted on a displaceable vehicle.

* * * * *